United States Patent
Park et al.

(10) Patent No.: US 10,254,973 B2
(45) Date of Patent: Apr. 9, 2019

(54) DATA MANAGEMENT SYSTEM AND METHOD FOR PROCESSING DISTRIBUTED DATA

(71) Applicants: SK hynix Inc., Gyeonggi-do (KR); Seoul National University R&DB FOUNDATION, Seoul (KR)

(72) Inventors: Daedong Park, Seoul (KR); Seongsoo Hong, Seoul (KR)

(73) Assignees: SK HYNIX INC., Gyeonggi-do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 36 days.

(21) Appl. No.: 15/476,234

(22) Filed: Mar. 31, 2017

(65) Prior Publication Data
US 2018/0129425 A1    May 10, 2018

(30) Foreign Application Priority Data
Nov. 4, 2016  (KR) .................. 10-2016-0147034

(51) Int. Cl.
*G06F 12/00* (2006.01)
*G06F 3/06* (2006.01)

(52) U.S. Cl.
CPC ............ *G06F 3/0611* (2013.01); *G06F 3/061* (2013.01); *G06F 3/065* (2013.01); *G06F 3/067* (2013.01); *G06F 3/0631* (2013.01); *G06F 3/0635* (2013.01); *G06F 3/0638* (2013.01); *G06F 3/0653* (2013.01); *G06F 3/0659* (2013.01); *G06F 3/0683* (2013.01)

(58) Field of Classification Search
CPC .... G06F 3/0611; G06F 3/0631; G06F 3/0638; G06F 3/0653; G06F 3/0659; G06F 3/067; G06F 3/0683; H04L 12/5689
See application file for complete search history.

(56) References Cited

U.S. PATENT DOCUMENTS

| 9,256,368 B2 | 2/2016 | Welnicki et al. |
| 2003/0079222 A1* | 4/2003 | Boykin ................ H04N 7/1675 725/31 |
| 2012/0136960 A1 | 5/2012 | Liu |

OTHER PUBLICATIONS

Borthakur, D., The Hadoop Distributed File System: Architecture and Design, 2007, The Apache Software Foundation.
Zaharia, M. et al., Discretized Streams: An Efficient and Fault-Tolerant Model for Stream Processing on Large Clusters, 2012, USENIX Association Berkeley.
Zaharia, M. et al., Resilient Distributed Datasets: A Fault-Tolerant Abstraction for In-Memory Cluster Computing, 2011, University ofCalifornia, Berkeley.

* cited by examiner

*Primary Examiner* — Shawn X Gu
(74) *Attorney, Agent, or Firm* — IP & T Group LLP

(57) ABSTRACT

A data management system and method for processing distributed data, which adaptively adjusts the amounts of data to be read from a plurality of storages, depending on I/O performances of the respective storages. The data management system includes a plurality of storage nodes each storing duplicate data of original data, and a distributed data management unit providing read requests for parts of the duplicate data to the respective storage nodes, combining the read parts into a complete version of the data, and outputting the complete version of the data.

14 Claims, 8 Drawing Sheets

DATA MANAGEMENT SYSTEM AND METHOD FOR PROCESSING DISTRIBUTED DATA

CROSS-REFERENCE TO RELATED APPLICATIONS

The present application claims priority to Korean Patent Application No. 10-2016-0147034, filed on Nov. 4, 2016, which is incorporated herein by reference in its entirety.

BACKGROUND

1. Field

Exemplary embodiments of the present invention relate to a data management system and method for processing distributed data, which stores the same data in a plurality of distributed storages, reads parts of requested data from the respective storages, and combines the parts with one another to build the requested data.

2. Description of the Related Art

Recently, a technique for providing a data service using a plurality of distributed storages connected through a network, for example, a cloud service has been actively used.

Furthermore, data traffic through a network such as a mobile network or internet of things (IOT) has rapidly increased.

Thus, it becomes a very important issue to not only increase the speed of the network itself, but also improve the performance of a data management system which stores data in physical media and reads requested data from the physical media.

The conventional data management system just stores duplicates of a data in a plurality of storages distributed over a network only to protect the data.

Therefore, there is demand for a new technique for an efficient data storage/read operation in a data management system including a plurality of distributed storages.

SUMMARY

Various embodiments are directed to a data management system and method for processing distributed data, which reads parts of a requested data from a plurality of storages distributed over a network and combines the parts with one another to build a complete version of the requested data when reading the requested data, duplicates of which are stored in the distributed storages, thereby improving the performance.

Also, various embodiments are directed to a data management system and method for processing distributed data, which adaptively adjusts amounts of the respective parts of the requested data to be read from the respective storages distributed over the network depending on I/O performances of the respective storages, thereby improving the performance.

In an embodiment, a data management system may include: a plurality of storage nodes each suitable for storing duplicate data of original data; and a distributed data management unit suitable for providing read requests for parts of the duplicate data to the respective storage nodes, combining the read parts into a complete version of the data, and outputting the complete version of the data.

In an embodiment, a data management method may include: allocating a bandwidth to each of a plurality of storage nodes; providing read requests for parts of a duplicate data stored in the respective storage nodes to the respective storage nodes; and combining the parts of the duplicate data read from the respective storage nodes into a complete version of the data, and outputting the complete version of the data.

DETAILED DESCRIPTION

Hereafter, various embodiments will be described below in more detail with reference to the accompanying drawings.

Figure 1:
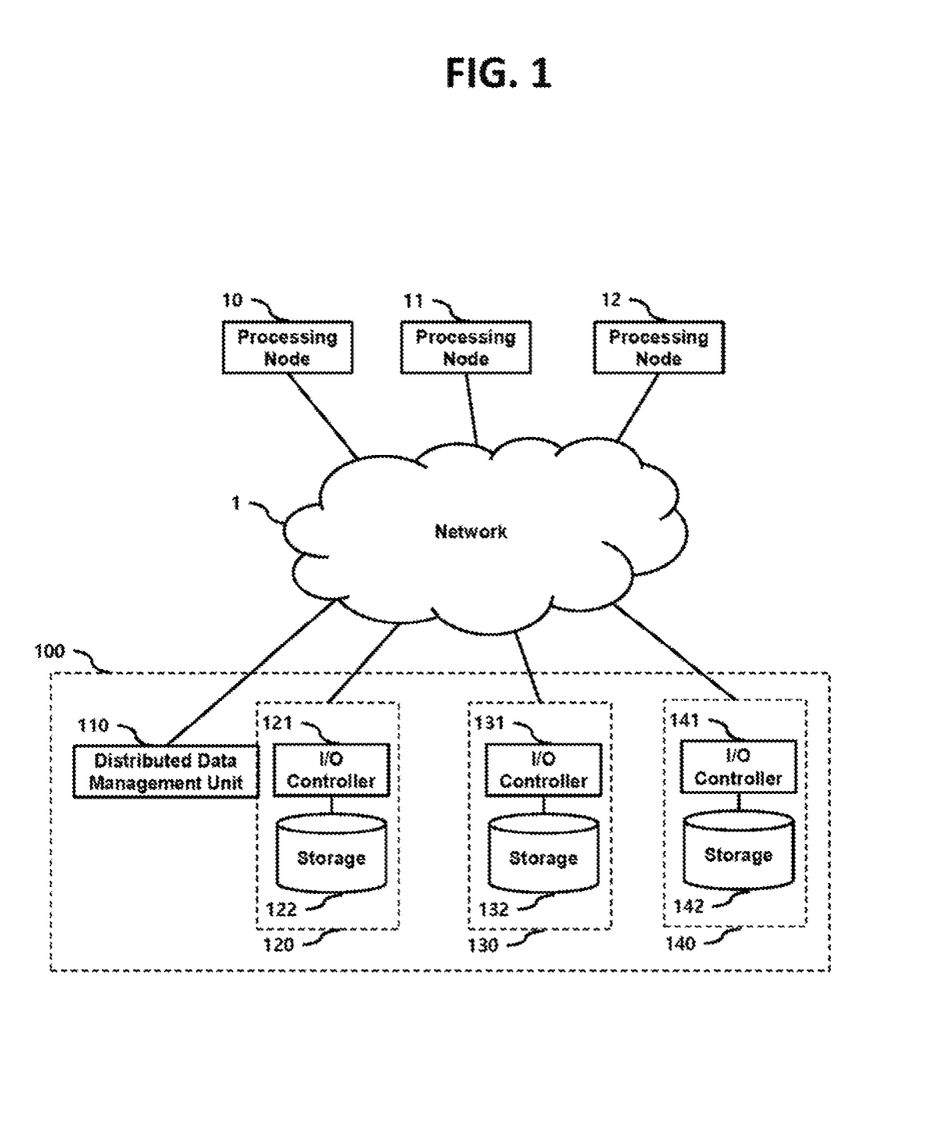
FIG. 1 is a block diagram illustrating a data management system according to an embodiment.

FIG. 1 is a block diagram illustrating a data management system 100 according to an embodiment.

The data management system 100 includes a distributed data management unit 110 and a plurality of storage nodes 120, 130 and 140 distributed over a network 1 and connected to the distributed data management unit 110 through the network 1.

FIG. 1 illustrates the data management system including three storage nodes distributed over the network 1. However, the number of storage nodes may vary depending on embodiments.

The storage nodes 120, 130 and 140 include I/O controllers 121, 131 and 141 and storages 122, 132 and 142, respectively.

The storages 122, 132 and 142 may indicate physical storage media such as hard disks (HDD) and solid state disks (SSD).

The I/O controllers 121, 131 and 141 control the storages 122, 132 and 142, respectively, according to a data I/O request provided through the distributed data management unit 110.

In the present embodiment, the network 1 may include a wide area network such as Internet, a local area network or storage area network or a combination thereof, and is not limited to a specific type of network.

As illustrated in FIG. 1, the distributed data management unit 110 may be independently provided outside the storage nodes 120, 130 and 140, and control the plurality of storage nodes 120, 130 and 140 through the network 1.

In the following disclosure, the distributed data management unit 110 and element included therein may be embodied by hardware, software or a combination of hardware and software.

In another embodiment, the distributed data management unit 110 may be directly connected to the storage nodes 120, 130 and 140 without a network therebetween, while being embedded in the storage nodes 120, 130 and 140 or present outside the storage nodes 120, 130 and 140.

Processing nodes 10, 11 and 12 may be connected to the data management system 100 through the network 1, and provide a data storage request or data read request to the data management system 100.

The processing node 10 may include various user terminals and servers using data to be stored into or read from the storage nodes 120, 130 and 140.

In accordance with an exemplary embodiment of the present invention, when a data storage request is provided from the processing node 10, the distributed data management unit 110 stores duplicates of requested data in the plurality of storages 120, 130 and 140, respectively.

In accordance with an exemplary embodiment of the present invention, when a data read request is provided from the processing node 10, the distributed data management unit 110 provides read requests for parts of read-requested data to the plurality of storage nodes 120, 130 and 140, respectively, combines the parts of read-requested data provided from the respective storage nodes 120, 130 and 140 to build the whole read-requested data, and outputs the built read-requested data to the processing node 10 through the network 1.

Figure 2:
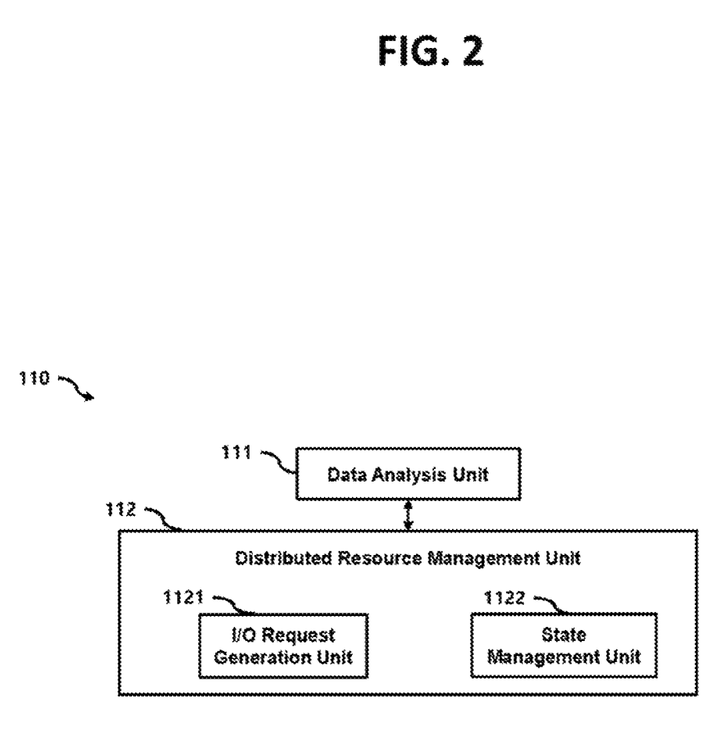
FIG. 2 is a detailed block diagram of a distributed data management unit of FIG. 1.

FIG. 2 is a detailed block diagram of the distributed data management unit 110.

The distributed data management unit 110 includes a data analysis unit 111 and a distributed resource management unit 112.

The data analysis unit 111 analyzes a type of a data request provided from the processing node 10 and length and address of data, and provides the analysis information to the distributed resource management unit 112.

The distributed resource management unit 12 includes an I/O request generation unit 1121 and a state management unit 1122.

The I/O request generation unit 1121 generates read or storage requests or an I/O request to be provided to the plurality of storage nodes 120, 130 and 140 according to the analysis information provided from the data analysis unit 111.

The state management unit 1122 stores information on a number and locations of the storage nodes 120, 130 and 140 having data stored therein and the states of the storage nodes 120, 130 and 140. The state management unit 1122 may manage such information using a distributed file system.

The I/O request generation unit 1121 may refer to the state management unit 1122 in order to generate the I/O request.

Figure 3:
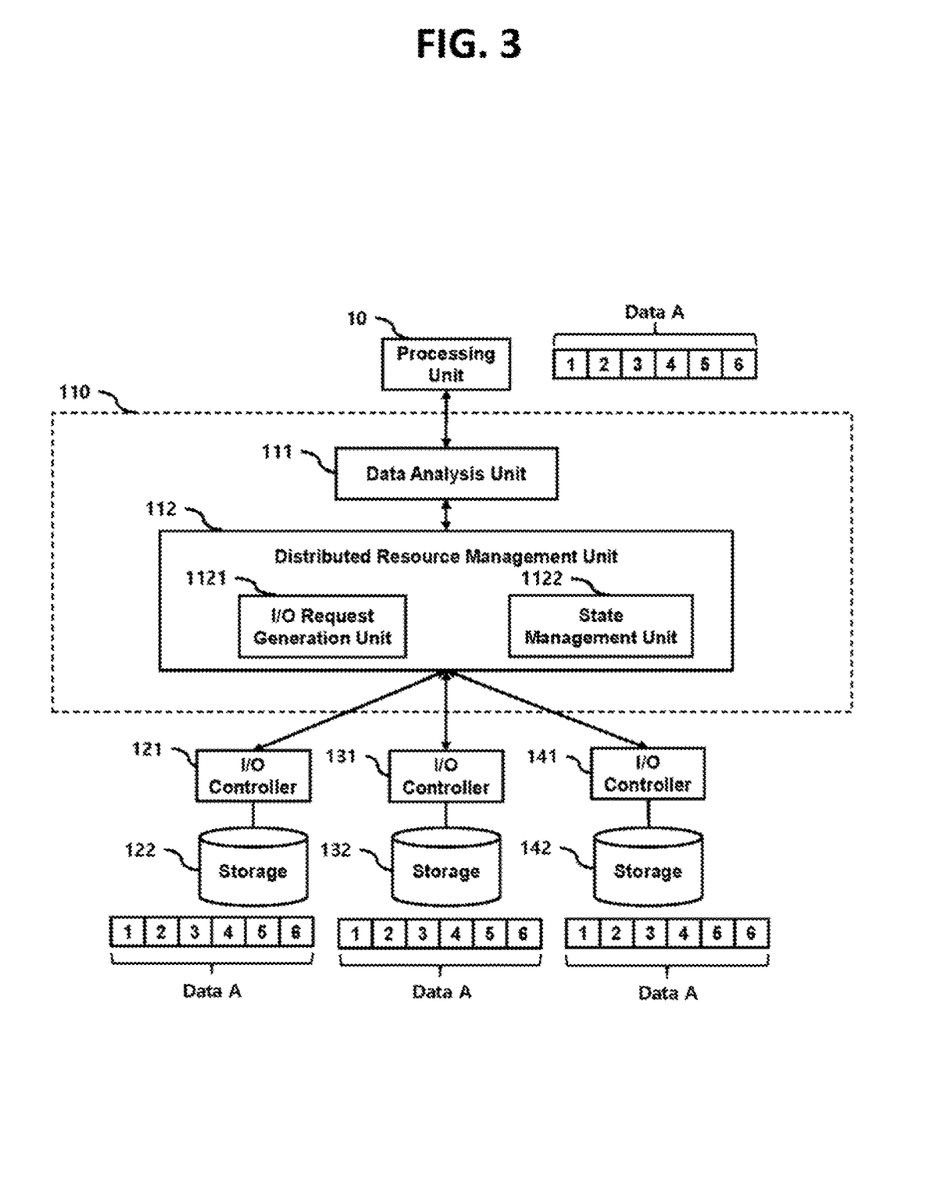
FIG. 3 is a diagram for describing an example of a storage operation of the data management system of FIG. 1.

FIG. 3 is a diagram for describing an example of a storage operation of the data management system 100.

FIG. 3 exemplifies that the processing node 10 provides a storage request for data A to the data management system 100 through the network 1.

FIG. 3 also exemplifies the data A includes 6 parts. At this time, each of the parts of data A may represent a unit of data processing such as a sector or block.

The data analysis unit 111 analyzes the type of the data request provided from the processing node 10 and the length of data, and provides the analysis information to the distributed resource management unit 112.

The I/O request generation unit 1121 provides the I/O request as the storage request for the data A to the storage nodes 120, 130 and 140.

The state management unit 1122 may store information on the location and state of the storage nodes 120, 130 and 140 where the data A are stored.

Upon receiving the storage request for the data A, the I/O controllers 121, 131 and 141 store duplicates of the data A in the storages 122, 132 and 142, respectively.

In the embodiment of FIG. 3, when storing the duplicates of the data A in the storages 122, 132 and 142, the I/O controllers 121, 131 and 141 sequentially store parts of the duplicates in the same order as the original data A, that is, from the first part to the sixth part.

Figure 4:
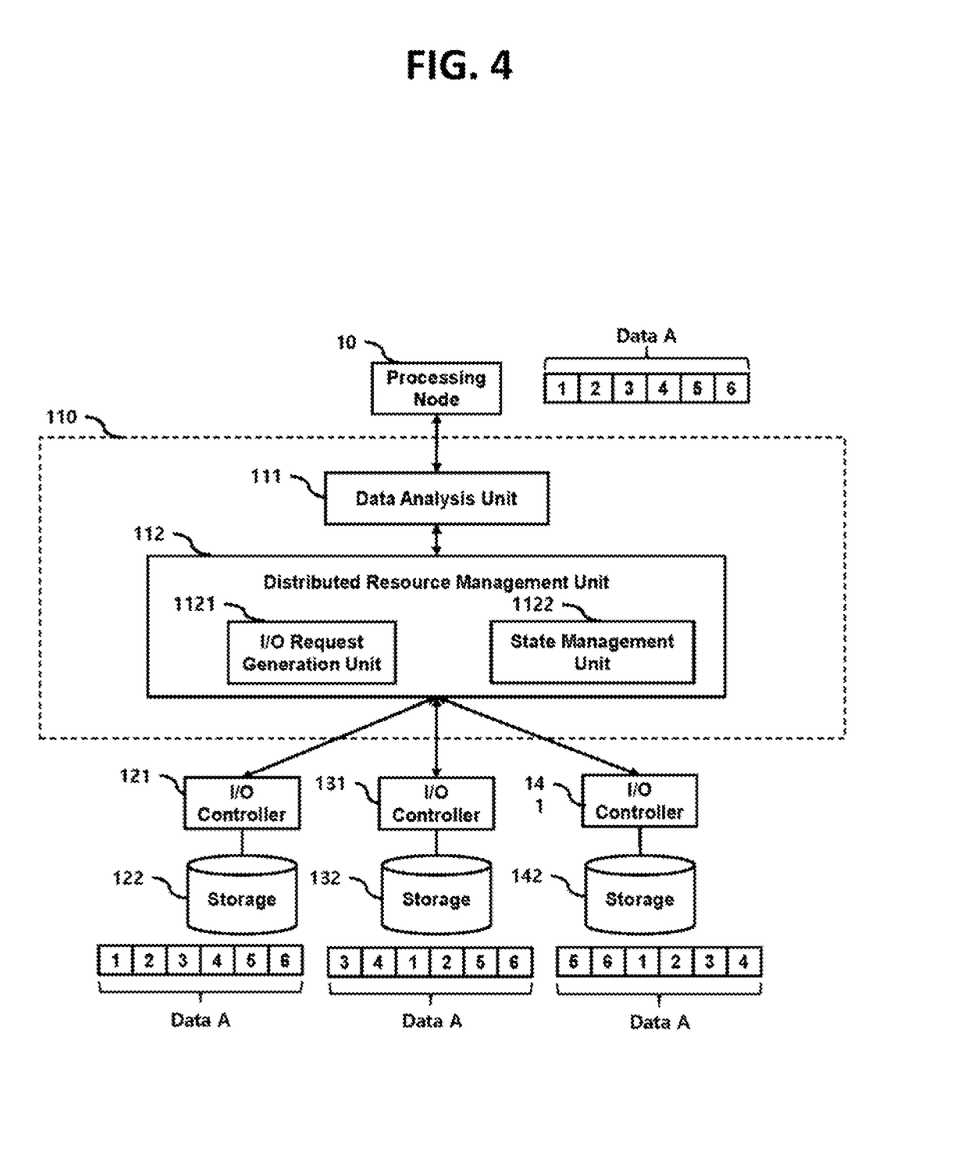
FIG. 4 is a diagram for describing another example of the storage operation of the data management system of FIG. 1.

FIG. 4 is a diagram for describing another example of the storage operation of the data management system 110.

In the embodiment of FIG. 4, the I/O controllers 121, 131 and 141 may store the duplicates of the data A in different orders from the original data A according to local access speed. It is presumed that the speed of accessing data stored first is greater than the speed of accessing data stored later since the data stored first is better positioned in the storages 122, 132 and 142 in terms of local access speed. It is also presumed that different two parts of the stored data A are read from the respective storage nodes 120, 130 and 140.

The I/O controller 121 stores the duplicate of the data A in the storage 122 in the same order as the original data, that is, from the first part to the sixth part.

The I/O controller 131 stores the duplicate of the data A in the storage 132 in a different order from the original data. For example, when storing the duplicate of the data A, the I/O controller 131 first stores the third and fourth parts of the data A, and then stores the first, second, fifth and sixth parts of the data A.

The I/O controller 141 stores the duplicate of the data A in the storage 142 in a different order from the original data. For example, when storing the duplicate of the data A, the I/O controller 141 first stores the fifth and sixth parts of the data A, and then stores the first, second, third and fourth parts of the data A.

In the present embodiment, when a data read request is provided, the data management system 100 does not read whole data A from each of the storages 122, 132 and 142, but reads parts of the data A from the respective storages 122, 132 and 142. Thus, when a part of the whole data A is first stored into corresponding one among the storages 122, 132 and 142 and then the part is read from the corresponding storage, the data read speed can be improved.

For example, when the first and second parts of the data A are read from the storage 122, the data read speed of the storage 122 may be improved. Also, when the third and fourth parts of the data A are read from the storage 132, the data read speed of the storage 132 may be improved. Further, when the fifth and sixth parts of the data A are read from the storage 142, the data read speed of the storage 142 may be improved.

In an embodiment, the to-be-read parts of the respective storage nodes 120, 130 and 140 may be predetermined. The I/O controllers 121, 131 and 141 may first store the to-be-read parts into the respective storages 122, 132 and 142, and then store the other data parts. Thus, when the to-be-read parts are read from the corresponding storage, the data read speed can be improved.

In another embodiment, when the I/O request generation unit 1121 provides a storage request to each of the I/O controllers 121, 131 and 141, the I/O request generation unit 1121 may designate an order of parts of the whole data A to be stored in the respective storages 122, 132 and 142 according to the local data access speed. According to the designated order, the I/O controllers 121, 131 and 141 may first store the to-be-read parts into the respective storages 122, 132 and 142, and then store the other data parts. Thus, when the to-be-read parts are read from the corresponding storage, the data read speed can be improved.

The local data access speed may be determined on the basis of an address range, access unit for example, a sector or block, and access cycle for requested data.

The local data access speed may be analyzed by the data analysis unit 111 and provided to the distributed resource management unit 112.

Figure 5:
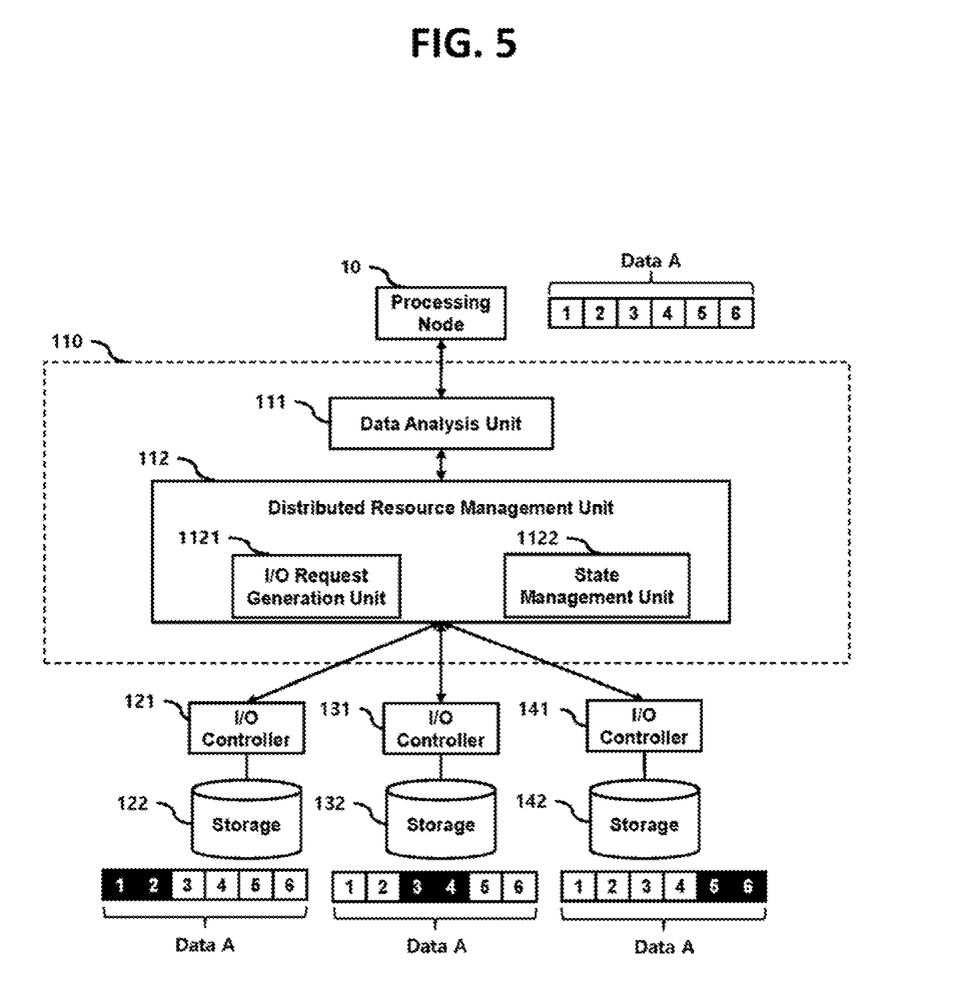
FIG. 5 is a diagram for describing an example of a read operation of the data management system of FIG. 1.

FIG. 5 is a diagram for describing an example of a read operation of the data management system 100.

The processing node 10 provides a read request for data A to the data management system 100 through the network 1.

The data analysis unit 111 of the distributed data management unit 110 provides information on the type of the request and the length of data to the distributed resource management unit 112.

The I/O request generation unit 1121 acquires information on the locations of the storage nodes 122, 132 and 142 in which duplicates of the requested data A are stored and information on available one among the storage nodes 122, 132 and 142 by referring to the information stored in the state management unit 1122.

The I/O request generation unit 1121 generates read requests for parts of the data A in the storage nodes 122 132 and 142, and provides the read requests to the I/O controllers 121, 131 and 141 of the respective storage nodes 120, 130 and 140.

In the embodiment of FIG. 5, it is presumed that the I/O request generation unit 1121 provides a read request for the first and second parts of the data A to the I/O controller 121, provides a read request for the third and fourth parts of the data A to the I/O controller 131, and a read request for the fifth and sixth parts of the data A to the I/O controller 141.

The I/O controllers 121, 131 and 141 read the corresponding parts from the storages 122, 132 and 142, and output the read parts to the distributed data management unit 110.

The distributed data management unit 110 combines the output parts of the data A, and provides the combined data A to the processing node 10 through the network 1.

As illustrated in FIG. 5, the data management system 100 can read parts of duplicates from the plurality of storages 122, 132 and 142 at the same time, and then combine the read parts to build a complete version of the read requested data. Thus, the read processing speed can be significantly improved.

Figure 6:
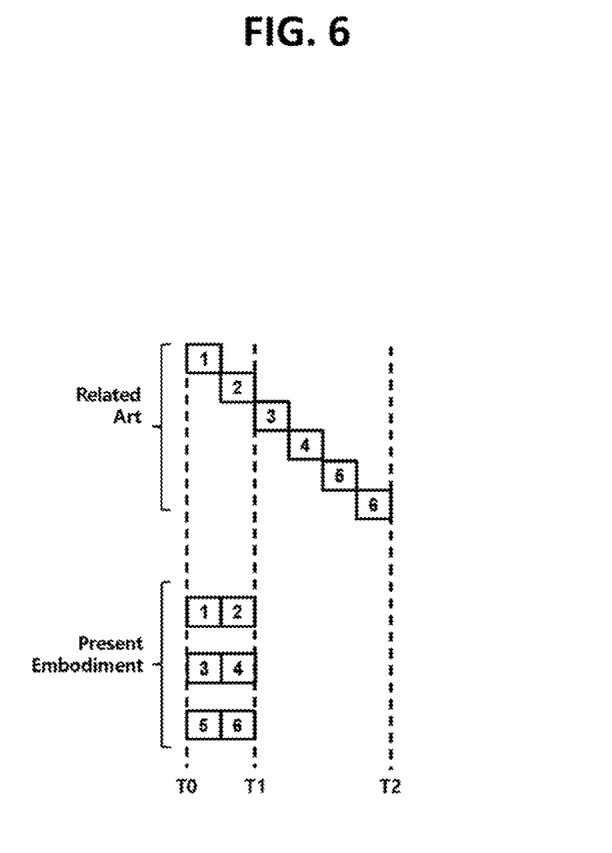
FIG. 6 is a diagram for describing the effect of the read operation of FIG. 5.

FIG. 6 is a diagram for describing the effect of the read operation of FIG. 5.

In the related art, a read request is provided to any one among distributed storage nodes at T0. Thus, an operation of sequentially reading first to sixth data parts is finished at T2.

In the present embodiment, however, a plurality of read requests are provided to the plurality of storages 122, 132 and 142 at T0. That is, a read request for the first and second data parts, a read request for the third and fourth data parts, and a read request for the fifth and sixth data parts are provided to the respective one of the storages 122, 132 and 142 at the same time. Thus, an operation for reading the data parts is finished at T1 earlier than T2.

Figure 7:
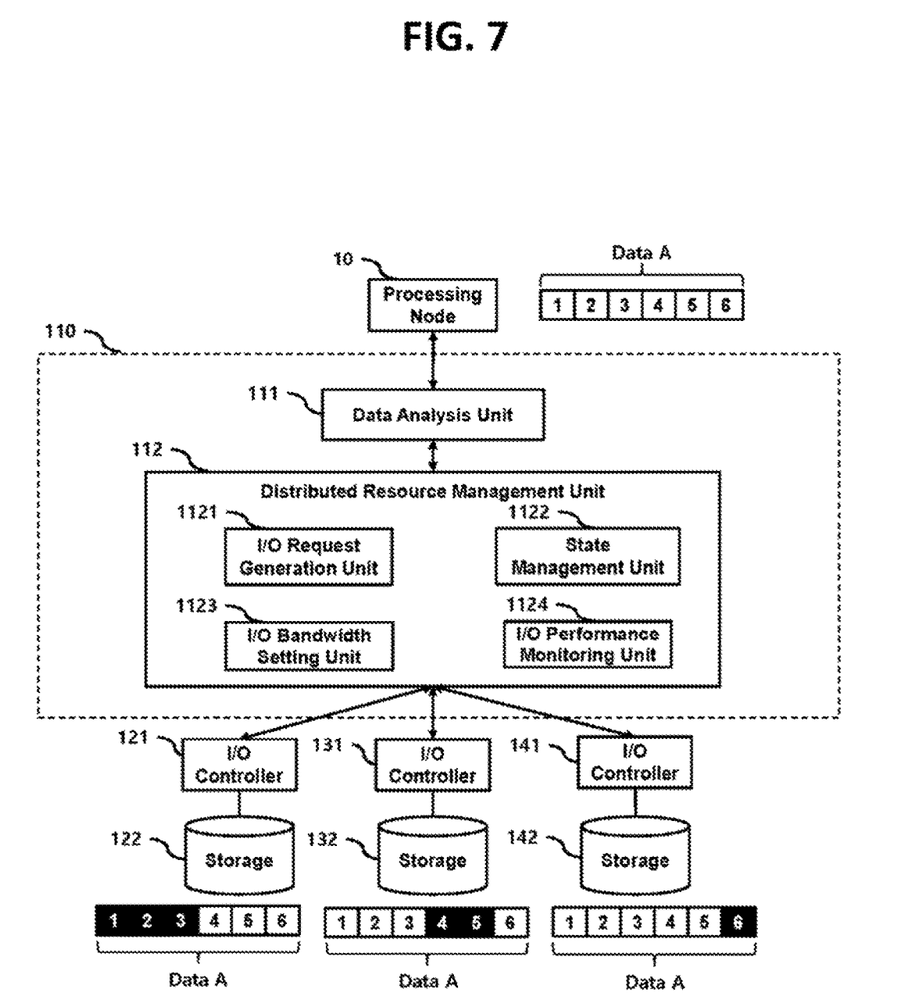
FIG. 7 is a diagram for describing another example of the read operation of the data management system of FIG. 1.

FIG. 7 is a diagram for describing another example of the read operation of the data management system of FIG. 1.

In the present embodiment, the data management system 100 adjusts the sizes of respective parts to read from the respective storage nodes 120, 130 and 140 according to the I/O performances of the respective storage nodes 120, 130 and 140.

In the present embodiment, the distributed resource management unit 112 further includes an I/O bandwidth setting unit 1123 and an I/O performance monitoring unit 1124.

The I/O performance monitoring unit 1124 monitors the I/O performances of the respective storage nodes 120, 130 and 140. The I/O performance may be evaluated according to the I/O speed, the maximum bandwidth, and the current bandwidth capacity of each of the storage nodes 120, 130 and 140.

The I/O bandwidth setting unit 1123 may decide the bandwidth or the amount of parts to be read from the respective storage nodes 120, 130 and 140 according to the I/O performance of the respective storage nodes 120, 130 and 140.

The I/O request generation unit 1121 generates an I/O request according to the decided bandwidth or the amount of parts for the respective storages 122, 132 and 142 decided by the I/O bandwidth setting unit 1123, and provides the generated I/O request to the respective I/O controllers 121, 131 and 141.

It is presumed that the storage node 120 has the best. I/O performance, the storage node 140 has the worst I/O performance, and the storage node 130 has the intermediate I/O performance.

For example, a read request for first, second and third data parts is provided to the I/O controller 121 of the storage node 120 of the best I/O performance, a read request for fourth and fifth data parts is provided to the I/O controller 131 of the storage node 130 of the intermediate I/O performance, and a read request for a sixth data part is provided to controller 141 of the storage node 140 of the worst I/O performance.

The data management system according to the present embodiment can variably adjust the bandwidth for each of the storage nodes 120, 130 and 140 according to the I/O performances of the storage nodes 120, 130 and 140 thereby reducing the entire data read time.

Figure 8:
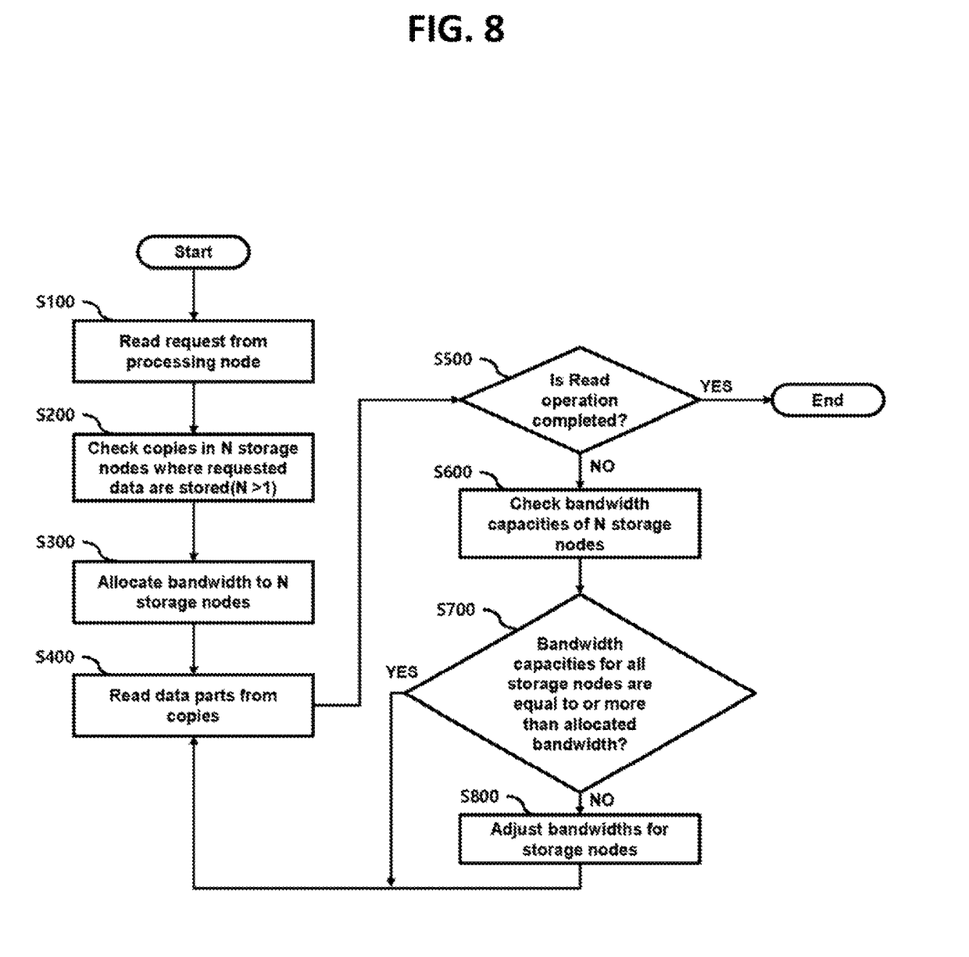
FIG. 8 is a flowchart illustrating an operation of the data management system according to the present embodiment.

FIG. 8 is a flowchart illustrating the operation of the data management system according to the present embodiment.

FIG. 8 illustrates the operation of the data management system of FIG. 7 which variably adjusts bandwidths for the storage nodes 120, 130 and 140 during a read operation.

The data management system 100 receives a read request from the processing node 10 at step S100.

The data management system 100 checks duplicates in the storage nodes 120, 130 and 140 where requested data are stored by referring to the information stored in the state management unit 1122.

The I/O bandwidth setting unit 1123 of the data management system 100 decides and allocates the bandwidth, or the amount of parts to be read from the respective storage nodes 120, 130 and 140 according to the I/O performance of the respective storage nodes 120, 130 and 140 at step S300.

At this time, the I/O bandwidth setting unit 1123 may decide the bandwidths of the respective storage nodes 120, 130 and 140 by referring to monitoring results of the I/O performance monitoring unit 1124 which monitors the I/O performances of the respective storage nodes 120, 130 and 140.

In another embodiment, the data management system 100 may allocate initial bandwidths equal to all of the storage nodes 120, 130 and 140 regardless of the current I/O performances.

Then, the data management system 100 reads designated parts from the duplicates stored in the respective nodes 120 130 and 140 at step S400.

Then, the data management system 100 determines whether the read operation for the requested data was completed at step S500.

When the read operation was completed, the data management system 100 ends the operation. Otherwise, the I/O performance monitoring unit 1124 of the data management system 100 checks the current bandwidth capacities of the respective storage nodes 120, 130 and 140 for the I/O performance of the respective storage nodes 120, 130 and 140 at step S600.

At step S700, the data management system 100 checks whether the current bandwidth capacities of the respective storage nodes 120, 130 and 140 are equal to or greater than the allocated bandwidth, which is decided at step S300.

When the current bandwidth capacities of the respective storage nodes 120, 130 and 140 are equal to or greater than the allocated bandwidth, the data management system 100 determines that there is no problem with the I/O performances of the storage nodes 120, 130 and 140, and proceeds to step S400 without changing the bandwidths of the respective storage nodes 120, 130 and 140.

Otherwise, the data management system 100 adjusts the bandwidths of the respective storage nodes 120, 130 and 140 at step S800.

At step S800 the data management system 100 can adjust the current bandwidth capacities of the respective nodes 120, 130 and 140 such that the number of storage nodes each having current bandwidth capacity of which is smaller than the allocated, bandwidth is minimized.

For example, the data management system 100 can reduce the allocated bandwidth for a storage node having a current bandwidth capacity of which is smaller than the currently allocated bandwidth, and increase the allocated bandwidth for a storage node having a current bandwidth capacity of which is equal to or greater than the currently allocated bandwidth, thereby minimizing the number of storage nodes each having current bandwidth capacity of which is smaller than the allocated bandwidth.

The data management system 100 can additionally adjust the allocated bandwidths to minimize a total amount of the allocated bandwidth exceeding a total amount of the current bandwidth capacities of all storage nodes 120, 130 and 140 when the number of storage nodes each having a current bandwidth capacity of which is smaller than the allocated bandwidth is minimized.

Then, the data management system 100 repeats steps S400 to S800 until the read operation is completed. The above-described operation may be periodically performed at a predetermined period.

According to the present embodiments, the data management system reads parts of read-requested data from the respective storages in which duplicates of the read-requested data are stored, and combines the read parts, into the complete version of the read-requested data, thereby significantly improving the data read speed.

The data management system adaptively adjusts the bandwidth or the amounts of parts to be read from the respective storages included therein according to the I/O performances of the respective storages, thereby improving the data processing speed.

Although various embodiments have been described for illustrative purposes, it will be apparent to those skilled in the art that various changes and modifications may be made without departing from the spirit and scope of the invention as defined in the following claims.

What is claimed is:

1. A data management system comprising:
a plurality of storage nodes each suitable for storing duplicate data of original data; and
a distributed data management unit suitable for providing read requests for parts of the duplicate data to the respective storage nodes, combining the read parts into a complete version of the original data, and outputting the complete version of the original data,
wherein the distributed data management unit comprises:
an input/output (I/O) performance monitoring unit suitable for monitoring I/O performances of the respective storage nodes by comparing current bandwidth capacities for the respective storage nodes with an allocated bandwidth of a corresponding one among the plurality of storage nodes; and
an I/O bandwidth setting unit suitable for determining and allocating I/O bandwidths for the respective storage nodes by referring to the I/O performances monitored the I/O performance monitoring unit by adjusting the allocated I/O bandwidths for the respective storage nodes when the current bandwidth capacities of one or more of the plurality of storage nodes are smaller than the allocated bandwidth of the one or more of the plurality of storage nodes.

2. The data management system of claim 1, wherein the distributed data management unit further comprises:
a state management unit suitable for managing information for the duplicate data and the plurality of storage nodes storing the duplicate data; and
an I/O request generation unit suitable for generating the read requests for the parts of the duplicate data to be provided to the respective storage nodes depending on the allocated I/O bandwidths for the respective storage nodes.

3. The data management system of claim 1, wherein the distributed data management unit adjusts the amounts of the parts of duplicate data to be read from the respective storage nodes by periodically referring to the I/O performances of the respective storage nodes.

4. The data management system of claim 1, wherein each storage node comprises:
a storage suitable for storing the duplicate data; and
an I/O controller suitable for controlling an I/O of the storage.

5. The data management system of claim 1, wherein the duplicate data has the same arrangement of parts included therein as an arrangement of parts included in the original data.

6. The data management system of claim 1, wherein the duplicate data has an arrangement of parts included therein different from an arrangement of parts included in the original data.

7. The data management system of claim 6, wherein the duplicate data has an arrangement of parts included therein in which to-be-read parts read by the respective storage node among whole parts included in the duplicate data are arranged before other parts among whole parts included in the duplicate data.

8. The data management system of claim 1, wherein the plurality of storage nodes are distributed over a network.

9. The data management system of claim 8, wherein the distributed data management unit is connected to the plurality of storage nodes through the network.

10. The data management system of claim 8, wherein the distributed data management unit is included in any one of the plurality of storages and connected to other ones among the plurality of storage nodes through the network.

11. A data management method comprising:
- allocating a bandwidth to each of a plurality of storage nodes;
- providing read requests for parts of a duplicate data stored in the respective storage nodes to the respective storage nodes;
- combining the parts of the duplicate data read from the respective storage nodes into a complete version of data, and outputting the complete version of the data;
- monitoring input/output (I/O) performances of the respective storage nodes; and
- adjusting allocated bandwidths for the respective storage nodes according to the monitored I/O performances,
- wherein the monitoring of the I/O performances comprises comparing current bandwidth capacities for the respective storage nodes with allocated bandwidth of a corresponding one among the plurality of storage nodes, and
- wherein the adjusting of the bandwidths comprises adjusting the allocated bandwidths of the respective storage nodes when the current bandwidth capacities of one or more of the plurality of storage nodes are smaller than the allocated bandwidth of the one or more of the plurality of storage nodes.

12. The data management method of claim 11, wherein the adjusting of the allocated bandwidths is performed such that a number of storage nodes each having a current bandwidth capacity which is smaller than an allocated bandwidth thereof, is minimized.

13. The data management method of claim 12, wherein the adjusting of the allocated bandwidths comprises reducing a currently allocated bandwidth of a storage node having current bandwidth capacity which is smaller than the currently allocated bandwidth thereof among the plurality of storage nodes.

14. The data management method of claim 12, wherein the adjusting of the allocated bandwidths is further performed to minimize a total amount of the allocated bandwidths exceeding a total amount of current bandwidth capacities of all of the plurality of the storage nodes, when number of storage nodes each having current bandwidth capacity which is smaller than the allocated bandwidth, is minimized.

* * * * *